(12) United States Patent
Lugnet et al.

(10) Patent No.: US 9,689,614 B2
(45) Date of Patent: Jun. 27, 2017

(54) METHOD FOR CARRYING OUT COMBUSTION IN AN INDUSTRIAL FURNACE

(75) Inventors: Anders Lugnet, Rimbo (SE); Tomas Ekman, Saltsjö-Boo (SE)

(73) Assignee: Linde Aktiengesellschaft, Munich (DE)

( * ) Notice: Subject to any disclaimer, the term of this patent is extended or adjusted under 35 U.S.C. 154(b) by 928 days.

(21) Appl. No.: 13/228,827

(22) Filed: Sep. 9, 2011

(65) Prior Publication Data

US 2012/0082946 A1 Apr. 5, 2012

(30) Foreign Application Priority Data

Sep. 30, 2010 (SE) .................................... 1051019

(51) Int. Cl.
| | |
|---|---|
| *F23N 1/02* | (2006.01) |
| *F23C 5/00* | (2006.01) |
| *F27B 9/30* | (2006.01) |
| *C03B 5/235* | (2006.01) |

(52) U.S. Cl.
CPC .......... *F27B 9/3011* (2013.01); *C03B 5/2353* (2013.01); *Y02P 40/55* (2015.11); *Y02P 40/57* (2015.11)

(58) Field of Classification Search
USPC ........ 431/181, 116, 12, 10, 8; 432/136, 146, 432/149, 152
See application file for complete search history.

(56) References Cited

U.S. PATENT DOCUMENTS

| | | | | |
|---|---|---|---|---|
| 2,018,956 | A * | 10/1935 | Hepburn ................ | F23C 99/00 431/10 |
| 3,091,446 | A * | 5/1963 | Smith ............................ | 432/20 |
| 6,126,438 | A * | 10/2000 | Joshi ...................... | F23C 7/002 110/336 |
| 6,203,314 | B1 * | 3/2001 | Philippe .................... | F23C 7/02 431/10 |
| 6,334,770 | B1 * | 1/2002 | Giraud ................. | C21D 9/0006 431/165 |
| 6,350,118 | B1 | 2/2002 | Philippe et al. | |
| 6,519,973 | B1 * | 2/2003 | Hoke, Jr. ................ | C03B 5/235 110/297 |

(Continued)

FOREIGN PATENT DOCUMENTS

| | | | |
|---|---|---|---|
| DE | 34 06 956 A1 | 8/1985 | |
| EP | 2071236 A2 * | 6/2009 | ............. F23L 15/02 |

(Continued)

*Primary Examiner* — Steven B McAllister
*Assistant Examiner* — Desmond C Peyton
(74) *Attorney, Agent, or Firm* — Joshua L. Cohen

(57) ABSTRACT

A method for combustion in an industrial furnace having fuel and a first oxidizer to heat a material includes arranging at least one lance in a sidewall of the furnace; supplying a second oxidizer with an oxygen content of at least 85 percent by weight in the form of a jet traveling at at least sonic velocity to the interior of the furnace through the at least one lance; running the jet of the second oxidizer in the horizontal plane above the material between and essentially in parallel with two consecutive rows of the roof burners; balancing an amount of the second oxidizer supplied per time unit so that the oxygen content supplied via the second oxidizer constitutes at least 50 percent by weight of the total supplied oxygen per time unit in the furnace.

13 Claims, 3 Drawing Sheets

(56) References Cited

U.S. PATENT DOCUMENTS

| | | | |
|---|---|---|---|
| 6,685,464 B2* | 2/2004 | Marin et al. | 431/10 |
| 6,705,117 B2* | 3/2004 | Simpson et al. | 65/134.4 |
| 7,594,811 B2* | 9/2009 | Lugnet et al. | 431/12 |
| 7,686,611 B2* | 3/2010 | Joshi et al. | 431/8 |
| 8,689,708 B2* | 4/2014 | Ekman et al. | 110/104 B |
| 2002/0045140 A1* | 4/2002 | Payne et al. | 431/5 |
| 2004/0157178 A1* | 8/2004 | Dugue et al. | 431/10 |
| 2005/0239005 A1* | 10/2005 | Lugnet et al. | 431/8 |
| 2006/0199119 A1* | 9/2006 | Abbasi et al. | 431/8 |
| 2006/0278100 A1* | 12/2006 | Ekman et al. | 99/450 |
| 2007/0172780 A1* | 7/2007 | Lugnet et al. | 431/10 |
| 2009/0148799 A1* | 6/2009 | Ekman et al. | 431/8 |
| 2010/0239988 A1* | 9/2010 | Simpson | 431/10 |
| 2011/0091823 A1* | 4/2011 | Ekman et al. | 431/4 |
| 2011/0207063 A1* | 8/2011 | Wu et al. | 431/12 |
| 2013/0071796 A1* | 3/2013 | Cole et al. | 431/8 |

FOREIGN PATENT DOCUMENTS

| | | | | |
|---|---|---|---|---|
| JP | 2009139086 A | * | 6/2009 | |
| JP | 2012078082 A | * | 4/2012 | |
| WO | WO 2006031163 A1 | * | 3/2006 | F23C 6/04 |

* cited by examiner

METHOD FOR CARRYING OUT COMBUSTION IN AN INDUSTRIAL FURNACE

The present invention relates to a method for carrying out combustion in an industrial furnace.

More specifically, the invention relates to operation of an industrial furnace which is heated by a matrix of a larger number of downwards directed roof burners, for example of so-called "flatflame" type, yielding a plate-shaped flame which often rotates. In general, such arrangement gives good thermal homogeneity in the furnace space, which is desirable.

Because of the high risk for surface damage to a material which is heated in the furnace by overheating, such roof burners are usually operated with air as oxidizer.

A problem with such heating is that the supplied air contains large amounts of nitrogen ballast, which leads to decreased energy efficiency and therefore to increased $CO_2$ emissions.

In order to increase energy efficiency, each individual roof burner can be designed as a regenerative burner. On the other hand, this constitutes a major investment.

Another problem is that comparatively high concentrations of $NO_x$ are formed during heating with such a matrix of roof burners.

Moreover, it would be desirable to be able to increase the maximum capacity in existing furnaces with roof burner matrices, without unacceptable temperature gradients as a result appearing in the furnace space.

The present invention solves the above described problems.

Thus, the invention includes a method during combustion in an industrial furnace, the interior of which is caused to be heated by a matrix of downwards directed roof burners, arranged in at least two rows in the roof of the industrial furnace, wherein the roof burners are driven with a fuel and a first oxidizer to heat a material in the interior of the furnace, and is characterised in that at least one lance is arranged in a side wall of the furnace, in that a second oxidizer with an oxygen content of at least 85 percent by weight is supplied to the interior of the furnace through the lance at sonic velocity or more, in the form of a jet of the second oxidizer, in that the jet of the second oxidizer is caused to run in the horizontal plane above the material, between and essentially in parallel to two consecutive rows of roof burners, and in that the amount of second oxidizer supplied per time unit is balanced so that the oxygen which is supplied via the second oxidizer constitutes at least 50 percent by weight of the total supplied oxygen per time unit in the furnace.

In the following, the invention will be described in detail, with reference to exemplifying embodiments of the invention and to the appended drawings, where:

Figure 1:
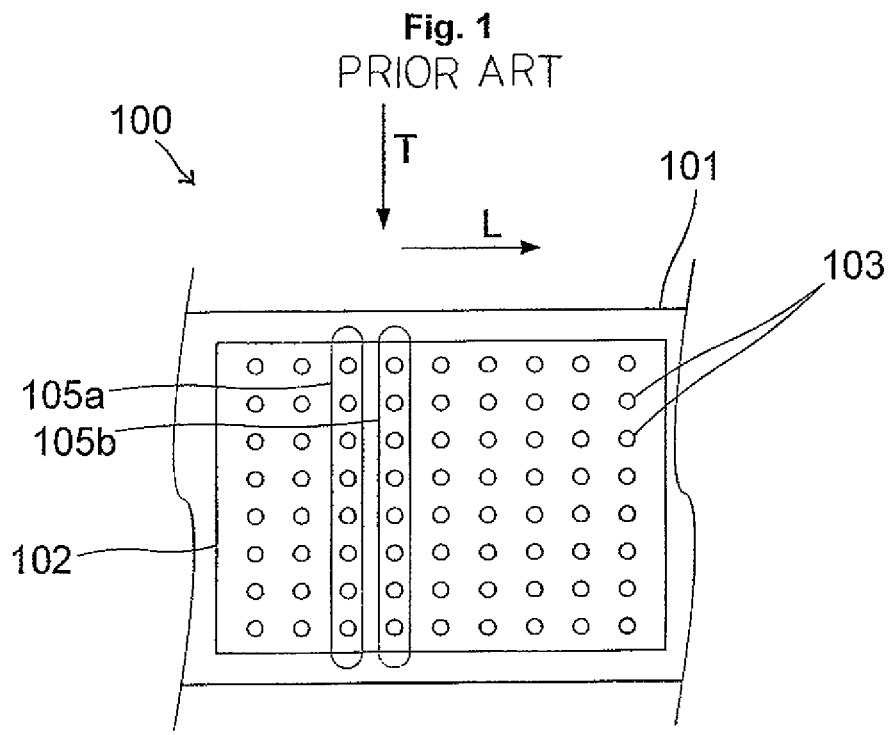
FIG. 1 is a cross-sectional view taken from above a part of a conventional industrial furnace.
Figure 2:
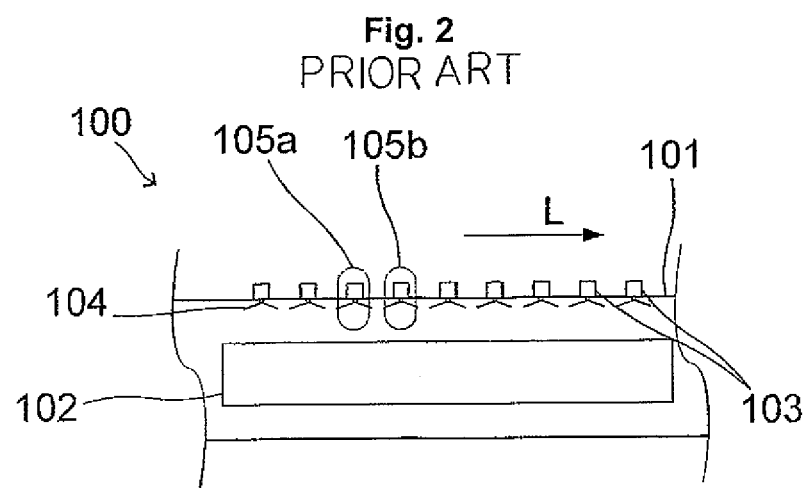
FIG. 2 is a cross-sectional view taken from the side of the part of the conventional industrial furnace shown in FIG. 1.

In FIG. 1 is shown, in cross-section from above, a part of an industrial furnace 100 in which, between the opposite respective side walls 101 of the furnace 100, a material 102 by way of example illustrated as a metal blank is conveyed in a direction L of elongation, under heating. FIG. 2 shows the same part of the industrial furnace 100, but in cross-section viewed from the side. FIGS. 1 and 2 share reference numerals for the same parts.

According to a preferred embodiment, the furnace part shown in FIG. 1 constitutes one of several furnace zones in the industrial furnace 100, in which illustrated zone heating as even as possible across the complete surface of the metal material 102 is the objective. In order to achieve such even heating, a matrix of downwards directed roof burners 103 are arranged to open out above the heated material 102, their flames directed downwards.

It is preferred that the roof burners 103 are of so-called "flafflame" type, i.e. they give rise to plate-shaped flames with large spread angle, which results in decreased risk of overheating of the surface of the material 102, in that the temperature homogeneity in the space above the upper surface of the material 102 becomes high.

The roof burners 103 are driven with a solid, liquid or gaseous fuel, such as natural gas; and an oxidizer. The oxidizer can be air or another oxidizer with an oxygen content of at the most 30 percent by weight.

It is preferred that the roof burners 103 are installed in the roof of the furnace 100, and that the vertical distance between said roof and the material 102 is between 1 and 3 meters, preferably between 1 and 2 meters.

According to the invention, the roof burners 103 are arranged in at least two rows, extending in a perpendicular direction T which suitably is perpendicular to the direction L of elongation. In FIGS. 1 and 2, two such rows 105a, 105b are shown with respective dotted markings. It is preferred that the distance between two such adjacently arranged rows 105a, 105b of roof burners is between 1 and 3 meters.

Such heating gives an even heating over the upper surface of the material 102, but suffers from the initially mentioned drawbacks.

Figure 3:
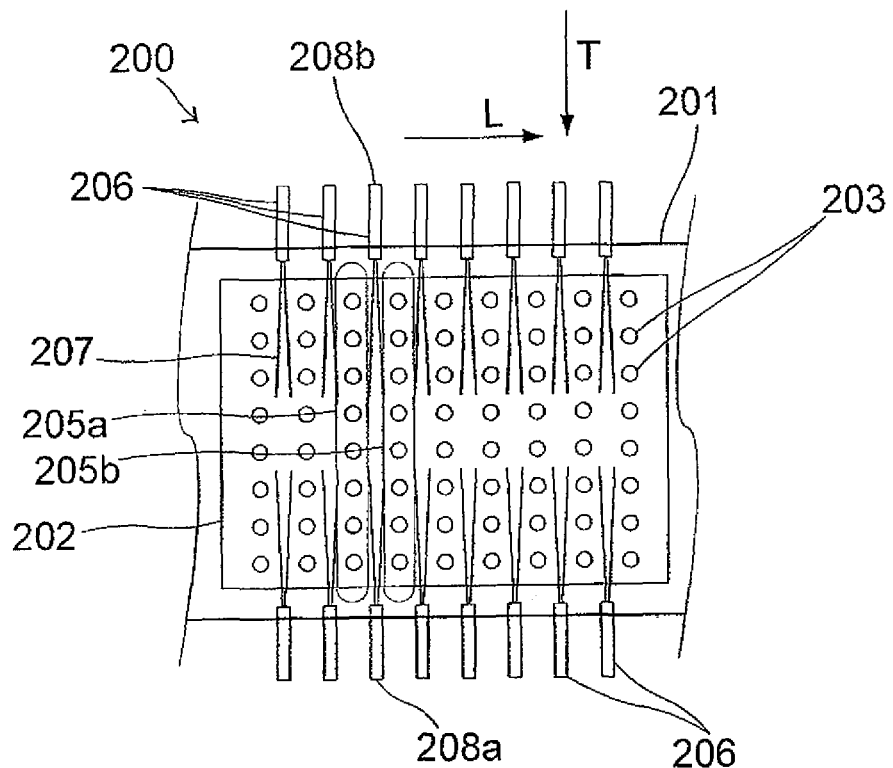
FIG. 3 is a cross-sectional view taken from above a part of an industrial furnace, in which a method according to a first preferred embodiment according to the present invention is applied.
Figure 4:
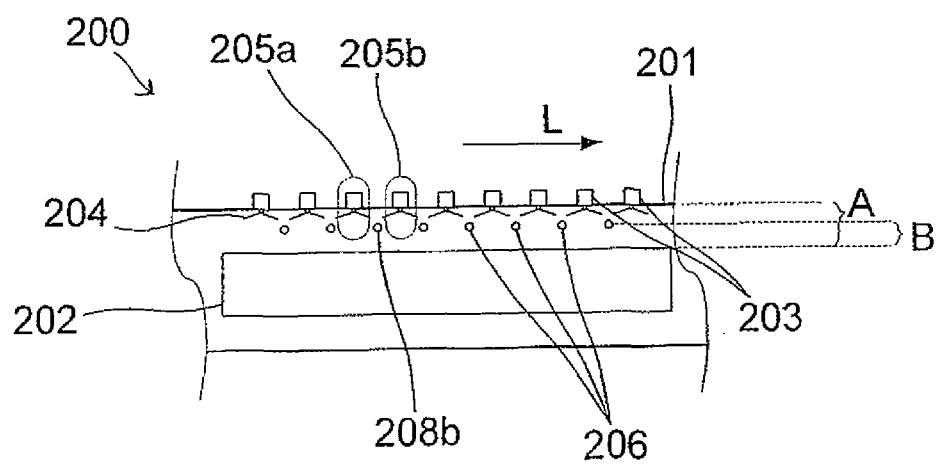
FIG. 4 is a cross-sectional view taken from the side of the part of the industrial furnace shown in FIG. 3.

FIGS. 3 and 4 show, in a manner corresponding to the FIGS. 1 and 2, respectively, in cross-section from above and from the side and using shared reference numerals, an industrial furnace 200 according to the present invention. The furnace 200 has side walls 201, and is associated with a direction L of elongation, along which a material 202 is conveyed through the furnace 200 while heated by a matrix of per se conventional roof burners 203 having flames 204, which burners 203 are of the type described above in connection with FIGS. 1 and 2 and arranged in at least two rows 205a, 205b in a perpendicular direction T, which suitably is perpendicular to the direction L of elongation. The above given distances, between burner rows 205a, 205b and between the material 202 and the roof, are valid also for the embodiments illustrated in FIGS. 3-5.

It is preferred that the roof burners 203 are arranged in at least three rows, more preferably at least five rows, most preferably at least seven rows, each comprising at least four, more preferably at least six, most preferably at least eight roof burners. An arrangement with this many roof burners results in substantial costs for modifying each individual roof burner in order to achieve increased efficiency and decreased emissions. Such modification can, for example, consist in that each burner is modified so that it becomes regenerative, using a respective recuperator. Since the present method brings about these advantages in a substantially more cost efficient manner, it is especially advantageous in furnaces having a large number of roof burners 203 in said burner matrix.

According to the invention, a second oxidizer with an oxygen content of at least 85 percent by weight is provided from at least one lance 206 for such oxidizer which is arranged in a sidewall 201 of the furnace 200. The lance 206 is arranged to supply the second oxidizer to the interior, heated space of the furnace 200 in the form of a jet 207 of the second oxidizer, at high velocity. According to the invention, the second oxidizer is supplied in the form of a jet 207 with at least sonic velocity.

Moreover, the jet 207 is directed so that it runs in the horizontal plane, above the upper surface of the material 202, and as a consequence between the material 202 and the inner roof of the furnace 200, as well as between and essentially in parallel with a pair of consecutive and therefore adjacent rows 205a, 205b of roof burners 203. That the jet 207 runs "in the horizontal plane" is to be understood so that it runs essentially horizontally, even if its direction also can have a minor vertical component. What is important is that the jet 207 runs along the space which is present between the material 202 and the roof.

Also, it is preferred that the jet 207 is arranged to run in parallel with the upper, horizontal surface of the material 202. Depending on the type of material to be heated, this upper surface can have different configurations, but in the exemplifying case of a metal blank or a glass melt, the said upper surface will be essentially plane and horizontal.

Moreover, the amount of second oxidizer which is supplied per time unit is balanced so that the oxygen supplied via the second oxidizer comprises at least 50 percent by weight, and so that the desired stoichiometrical conditions are achieved with respect to the amount of oxygen in relation to the amount of fuel.

The supply of such second oxidizer with high oxygen concentration, high velocity and between and along two rows 205a, 205b of roof burners 203, results in a number of advantages.

Firstly, the efficiency of the heating in the furnace 200 part in question can be increased, since a lesser amount of nitrogen is supplied to the furnace atmosphere as compared to an oxidizer with smaller oxygen content, such as for example air, would constitute a larger share of the totally supplied oxidizer. Thus, the heating efficiency can be increased while keeping the fuel consumption stable, which leads to advantages among others in terms of environmental impact and economy. At the same time, there is no risk of overheating of the surface of the material 202, since the second oxidizer which is lanced at high velocity brings about heavy turbulence in the furnace, in turn resulting in the total flame volume increasing while the peak flame temperatures decrease.

That the peak flame temperatures decrease also results in that the production of $NO_x$ decreases, which is desirable. It has been found that the relative amount of formed $NO_x$, but also of $CO_2$, decreases heavily as a function of the proportion of the total amount of oxygen which originates from the second oxidizer, up to about 50 percent by weight, in certain cases up to 70 percent by weight, oxygen from the second oxidizer.

Since the lance 206 is oriented so that the jet 207 runs in parallel with and between the rows 205a, 205b of roof burners 203, it can be arranged so that it only disturbs the normal function of the roof burners 203 minimally, which results in that the good spread of the heating efficiency from these roof burners 203 can be maintained. At the same time, the positive effects of increased turbulence can be exploited. In order to achieve this, it is preferred that the spread angle of the jet 207 is maximally 10°.

Furthermore, the maximum heating power can be increased additionally, depending on the type of roof burners 203 used, without modifying the construction of the roof burners 203. Namely, in many cases it is possible to increase the amount of fuel supplied via the roof burners 203, and then to balance this increased amount of fuel against the total amount of supplied oxidizer by increasing the amount of supplied second oxidizer per time unit. As a consequence of the heavy turbulence achieved by the jet 207, such increased power will not lead to an increased risk for overheating of the surface of the material 202.

Actually, the above described high velocity lancing of the second oxidizer leads to that the temperature homogeneity in the volume being heated by the roof burners 203, between the upper surface of the material 202 and the inner roof of the furnace 200, increases as a consequence of the increased turbulence therein.

Also, these advantages can be achieved using only one lance 206 for a number, such at least five, of roof burners 203. To install such a lance 206 is considerably less expensive than modifying at least five roof burners in other ways.

"Sonic velocity" or "Mach 1" shall, in this context, be construed as the sonic velocity in the interior of the furnace 200 at the prevailing temperature and gas composition therein. According to a preferred embodiment, the second oxidizer is supplied, with the corresponding meaning, at a velocity of at least Mach 1.5. Such high lancing velocity will result in so-called flameless combustion, during which the total flame volume is very large and the peak flame temperatures therefore are very low, and the temperature homogeneity very high. It is especially preferred to use venturi valves in the orifices of the lances 206.

According to an especially preferred embodiment, the second oxidizer has an oxygen content of at least 95 percent by weight, and is most preferably comprised of industrially pure oxygen. This results in that the amount of nitrogen gas ballast is minimized, and that the efficiency therefore is maximized. Moreover, the jet 207 can be made smaller and narrower and with a more precisely controllable volume extension, in turn resulting in that the disturbance to the operation of the roof burners 203 can be minimized.

Furthermore, it is preferred that the amount of second oxidizer supplied per time unit is balanced so that the oxygen supplied via the second oxidizer comprises at least 60% of the total supplied oxygen per time unit in the furnace 200.

In the preferred case where at least one, or a number of, most preferably all, roof burners 203 are conventional burners driven with an oxidizer with a comparatively low oxygen content, such as conventional air burners, it is preferred that these are air cooled. In this case, it is in turn preferred that the air flow through the affected roof burners 203, most preferably all air cooled roof burners 203 in the matrix, during operation with lancing of a second oxidizer, are set to the lowest possible level at which adequate cooling of the roof burners 203 is still possible, and it is also preferred that the amount of supplied second oxidizer is controlled so that a desired global stoichiometric equilibrium is achieved in the furnace 200. The lowest possible level of air supply for adequate cooling will naturally depend upon the design details of the air cooled roof burners in question, and upon other operation conditions, but such control of the air supply leads to the possibility to maximize the advantages of the invention at the same time as no modification is required to the existing air cooled roof burners 203.

It is preferred that the lance 206 opens out between the material 202 and the inner roof of the furnace 200 at a vertical distance B, from the highest point of the upper surface of the material 202, of between 40% and 70%, more preferably between 50% and 60%, of the smallest vertical distance A between the material 202 and the inner roof of the furnace 200. A positioning too far up towards the inner roof will lead to the flames of the roof burners 203 being disturbed more than necessary, the second oxidizer supplying thermal energy further up in the furnace atmosphere than what is desirable, as well as to the jet 207 being pulled towards the furnace roof. Too low a position will result in the risk being increased for harmful oxidization of the upper surface of the material 202. The stated interval has proven ideal for avoiding these problems during application of the present invention in conventional furnaces.

As is shown in FIGS. 3 and 4, respective lances 206 for the second oxidizer are installed in the furnace walls 201, and are arranged to supply respective jets 207 of the second oxidizer in all spaces between rows of roof burners 203 in the matrix of such burners. Such an arrangement is preferred, but not necessary. The advantages of the invention will accrue to a corresponding degree even if such lances 206 are installed only for supply of oxidizer jets 207 between only one pair 205a, 205b of roof burners 203 or between only a certain number of such pairs.

Furthermore, FIGS. 3 and 4 illustrate an embodiment which is preferred when the furnace 200 is at least 8 meters wide in a direction which is parallel to the rows 205a, 205b of roof burners 203. In this case, it is thus preferred that a respective lance 208a, 208b is arranged to supply the second oxidizer in the above described way from a respective lance orifice arranged at either side of the furnace 200, opposite one another, so that the respective jets of second oxidizer run in parallel but in opposite directions towards each other. In this case, oxidizer is thus supplied from two opposite directions to one and the same space between two adjacent rows 205a, 205b of roof burners 203. Even if the distance between the respective orifices of these opposite lances 208a, 208b in this case is at least about 8 meters, good effects can be achieved along essentially the whole space between the rows 205a, 205b.

Figure 5:
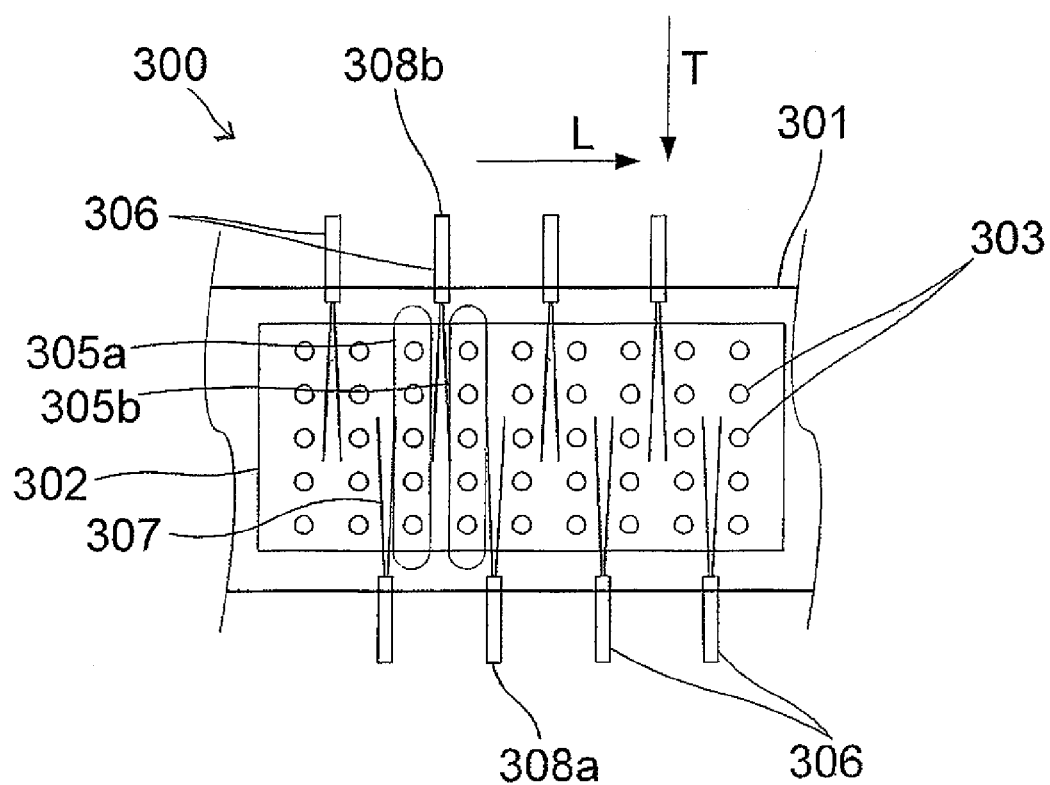
FIG. 5 is a cross-sectional view taken from above a part of an industrial furnace in which a method according to a second preferred embodiment according to the present invention is applied.

On the other hand, FIG. 5 shows in a view corresponding and similar to the one shown in FIG. 3, a preferred embodiment for an industrial furnace 300 which is at the most 10 meters wide in a direction parallel to the rows 305a, 305b of roof burners 303 in a matrix. The furnace 300 comprises side walls 301, and a material 302 to be heated using the roof burners 303 is conveyed in a direction L of elongation. The rows 305a, 305b run in a perpendicular direction T, suitably perpendicular to the direction L of elongation. The other oxidizer is supplied in the form of high velocity jets 307 through lances 306, all of which is similar to what has been described above in connection to FIGS. 3 and 4.

In this case, it is preferred that several respective lances 308a, 308b for the second oxidizer are arranged to supply the second oxidizer in the above described manner, from respective orifices arranged on either sides of the furnace 300 and so that respective jets of second oxidizer are supplied in different, opposite directions along rows 305a, 305b of roof burners 303 in different respective spaces between such rows. In FIG. 5, jets 307 are arranged in one direction in every other space between the rows 305a, 305b, and in the opposite direction in the other spaces, even if other arrangements also are possible. Preferably, the lances 306 are in this case arranged so that a closed loop circulation for the second oxidizer arises in the furnace 300, along the different spaces. between the rows 305a, 305b, because of the opposite orientation of the different lances 306. Herein, the expression "closed loop circulation" denotes a circulation driven by the kinetic energy of the different jets 307 of the second oxidizer, resulting in at least one closed circulation loop of gases. In order to achieve such a circulation loop it is preferred that the matrix comprises at least three rows of roof burners 303. Such circulation brings about adequate thermal homogeneity, even in relatively small industrial furnaces.

According to an especially preferred embodiment of the present invention, the invention is applied to an existing industrial furnace 100 in order to increase efficiency and temperature homogeneity, as well as to decrease the amount of formed $NO_x$ and $CO_2$ during operation thereof. The industrial furnace 100 comprises, as described above, a matrix of conventional, air driven roof burners 103, which in an initial step are supplemented by at least one lance 206, 306 for a second oxidizer having a high oxygen content and high velocity, as described above. The amount of supplied air and second oxidizer is then balanced during operation, in order to achieve an increased stoichiometric mixture of oxidizer and fuel in the above described way. This constitutes a cost efficient way to achieve the advantages of the present invention.

According to a preferred embodiment, in a first step the matrix of existing air roof burners 103 is supplemented by one or several lances 206, 306 according to the above, and thereafter the amount of fuel supplied per time unit through the air burners 103 is adjusted up, in combination with an increase of the total amount of supplied oxygen per time unit to achieve stoichiometric equilibrium. This presupposes that the roof burners 103 are of a type which allows adjusting up the supply of fuel, and achieves that the maximum heating efficiency in the furnace 200, 300 increases as compared to the conventional case, without risking overheating of the surface the material 202, 302.

Above, preferred embodiments have been described. However, it is apparent to the skilled person that many modifications may be made to the described embodiments without departing from the idea of the invention.

For example, it is not necessary that the rows of roof burners in the matrix are perpendicular to the direction of transportation of the material in the furnace. They may also, for example, be essentially parallel to said direction of transportation, or arranged at a non-right angle relative thereto. In this case, the lances for the second oxidizer may be arranged at one short end of the furnace, or in any other suitable way achieving the above described purposes.

Thus, the invention shall not be limited to the above described embodiments, but may be varied within the scope of the enclosed claims.

The invention claimed is:

1. A method for combustion in an industrial furnace, the interior of which is caused to be heated by a matrix of downwards directed roof burners arranged in at least two rows in the roof of the industrial furnace, wherein the roof burners are driven with a fuel and a first oxidizer to heat a material in the interior of the furnace, comprising:
   providing the matrix of downwards directed roof burners in the roof;

arranging at least one oxidizer lance in a sidewall of the furnace;

supplying a second oxidizer with an oxygen content of at least 85 percent by weight in the form of a jet traveling at at least sonic velocity to the interior of the furnace through the at least one oxidizer lance;

running the jet of the second oxidizer in a horizontal plane above the material between and essentially parallel with two consecutive rows of the roof burners; and balancing an amount of the second oxidizer supplied per time unit so that the oxygen content supplied via the second oxidizer constitutes at least 50 percent by weight of total supplied oxygen per time unit in the furnace.

2. The method according to claim 1, wherein supplying the second oxidizer is at a velocity of at least Mach 1.5.

3. The method according to claim 1, wherein that the second oxidizer comprises an oxygen content of at least 95 percent by weight.

4. The method according to claim 1, wherein the balancing the amount of the second oxidizer supplied per time unit, comprises balancing the amount of the second oxidizer so that the oxygen content supplied via the second oxidizer constitutes at least 70 percent by weight of the total supplied oxygen per time unit in the furnace.

5. The method according to claim 1, wherein the first oxidizer comprises air.

6. The method according to claim 5, wherein the roof burners comprise air cooled air burners, and further comprising controlling air flow through the roof burners to the lowest possible level at which adequate cooling of the roof burners is possible, and controlling an amount of the second oxidizer supplied so that a desired global stoichiometric equilibrium is achieved in the furnace.

7. The method according to claim 1, wherein the matrix of roof burners comprises at least three rows of the roof burners and at least four roof burners in each of the rows.

8. The method according to claim 1, wherein the at least one oxidizer lance opens out at a height along the sidewall between an upper surface of the material and an inner roof of the furnace at a vertical distance from a highest point of the upper surface of the material of between 50% and 60% of the smallest vertical distance between the material and the inner roof of the furnace.

9. The method according to claim 1, wherein the furnace is at least 8 meters wide in a direction parallel to the rows of the roof burners, and comprising arranging a respective lance for the second oxidizer to supply the second oxidizer at said at least sonic velocity from a respective orifice arranged at either side of the furnace opposite each other so that respective jets of the second oxidizer are parallel but directed in opposite directions towards each other.

10. The method according to claim 1, wherein the matrix of roof burners comprises at least three rows, the furnace is not greater than 10 meters wide in a direction parallel to the rows of the roof burners and wherein the at least one oxidizer lance comprises a plurality of oxidizer lances, and further comprising arranging the plurality of oxidizer lances for the second oxidizer to supply the second oxidizer at said at least sonic velocity from respective orifices arranged on either side of the furnace, and supplying respective jets of the second oxidizer in opposite directions towards each other along rows of the roof burners in different respective spaces between said rows for providing a closed loop circulation of the second oxidizer in the respective spaces.

11. The method according to claim 1, wherein a spread angle for the jet of the second oxidizer is not greater than 10°.

12. A method for increasing efficiency and temperature homogeneity, as well as decreasing an amount of formed $NO_x$ and $CO_2$ in an industrial furnace having a matrix of air driven roof burners, comprising:

downwardly directing the air driven roof burners toward a material in the furnace;

supplementing the furnace with at least one oxidizer lance for a second oxidizer to be provided to the furnace;

arranging the at least one oxidizer lance in a sidewall of the furnace;

supplying the second oxidizer with an oxygen content of at least 85 percent by weight in the form of a jet traveling at at least sonic velocity to the interior of the furnace through the at least one oxidizer lance;

running the jet of the second oxidizer in a horizontal plane above the material in the furnace between and essentially parallel with two consecutive rows of the roof burners; and balancing an amount of the second oxidizer supplied per time unit so that the oxygen content supplied via the second oxidizer constitutes at least 50 percent by weight of the total supplied oxygen per time unit in the furnace.

13. The method according to claim 12, comprising balancing an amount of supplied fuel per time unit through the roof burners to a total supplied oxygen per time unit during operation and when needed, wherein maximum heating power is caused to increase for the furnace.

* * * * *